United States Patent Office 3,186,791
Patented June 1, 1965

3,186,791
PRODUCTION OF WATER FREE BORATES
Harry Kloepfer, Frankfurt am Main, and Helmut Knorre, Hainstadt (Main), Germany, assignors to Deutsche Gold- und Silber-Scheideanstalt vormals Roessler, Frankfurt, Germany
No Drawing. Filed Oct. 22, 1962, Ser. No. 232,303
Claims priority, application Germany, Oct. 20, 1961, D 37,278
10 Claims. (Cl. 23—59)

The present invention relates to a process for the production of water free borates by reaction of alkali metal compounds or mixtures of alkali metal and alkaline earth metal compounds with sodium tetraborate.

It is known that borates, such as, for example, sodium metaborate, can be produced by melting together an alkali metal oxide or hydroxide with boron trioxide. A further process is known in which sodium tetraborate is reacted with an alkali metal carbonate in the fused state. In such processes it is not always possible to produce products of a certain predetermined composition or to produce water free products especially if the reaction proceeds with liberation of water.

According to the invention it was found that water free alkali metal borates having a molecular ratio of alkali metal oxide to boron trioxide greater than 1:2 can be produced in a simple smooth reaction by reacting water free sodium tetraborate with an alkali metal oxide. Depending upon the proportions used metaborates or ortho borates or mixtures thereof are produced. The advantage of the process resides in that the starting materials employed are easily available and can easily be produced in water free form and furthermore can be measured out in the reaction mixture in a most exact manner. Surprisingly, depending upon the proportions of the reactants in the starting mixtures, some of the mixtures can be ignited at room temperature with the aid of a local source of heat, such as, for example, a glowing wire or an ignition pellet, whereupon the reaction with a strong increase in temperature propagates itself through the entire reaction mixture. However, it is also possible to initiate the reaction by suitable heating of the entire reaction mixture which then proceeds to completion with short timed and sharp temperature increase.

A further advantage of the process according to the invention is that it is also possible to use the starting components, for example, sodium tetraborate and sodium oxide, in an unground but well mixed state. In such case the sodium borate is in the form of a relatively fine powder and the sodium oxide is in the form of spheres about 0.5 to 1 mm. in diameter. In this embodiment of the process the omission of the grinding provides for a considerable saving in time.

According to another embodiment of the process a portion of the alkali metal can be replaced by an alkaline earth metal oxide so that mixed borates are produced as end products in which the ratio of alkali metal and alkaline earth metal oxide to boron trioxide is greater than 1:2. Such mixtures with increasing alkaline earth metal oxide content become more and more difficult to cause to react by localized ignition but, on the other hand, react without trouble when the mixture is heated over a certain threshold temperature which also is dependent upon composition. In general, it is preferable that the proportion of oxide reactant is between 1 and 5 mols per mol of sodium tetraborate.

The following table shows the ignition and reaction temperatures of variously composed mixtures of sodium tetraborate and sodium oxide or respectively sodium oxide and calcium oxide. The mixtures were ground before the reaction. The left column gives the compositions of the reaction mixture, columns II and III, respectively give the temperature at which the mixture in question "ignites" (that is, the temperature at which the reaction begins) and the temperature reached after a short period of time during the course of the reaction. The brief rise in temperature is a criterion for the progress of the reaction. Columns IV and V concern the results obtained when mixtures at room temperature were locally ignited with a glowing iron rod. A + sign in column IV indicates that ignition of the reaction mixture was achieved by this method whereas a — sign indicates that the mixture was not ignitable by this method. Column V indicates the temperatures reached.

| Reaction mixture | II Ignition at ° C. | III Temperature increase to ° C. | IV Ignition at room temperature | V Temperature increase to ° C. |
|---|---|---|---|---|
| $Na_2B_4O_7+Na_2O$ | 280 | 540 | (¹) | (¹) |
| $Na_2B_4O_7+2Na_2O$ | 280 | 580 | + | 540 |
| $Na_2B_4O_7+3Na_2O$ | 270 | 640 | + | 600 |
| $Na_2B_4O_7+4Na_2O$ | 290 | 630 | + | 620 |
| $Na_2B_4O_7+5Na_2O$ | 305 | 590 | + | 520 |
| $Na_2B_4O_7+3Na_2O+2CaO$ | 420 | 660 | + | 540 |
| $Na_2B_4O_7+2Na_2O+3CaO$ | ² 270 / 450 | 370 / 490 | | |
| $Na_2B_4O_7+Na_2O+4CaO$ | ² 270 / 500 | 320 | | |

¹ Not observed.
² Evidently the reaction in these instances proceeded in two steps, in which, however, the actual reaction is considerably less pronounced thermally than with mixtures containing less calcium oxide or are free thereof.

The reaction proceeds in a similar manner when the reactants are unground. For example, a mixture of $Na_2B_4O_7+3Na_2O$ in which the $Na_2O$ was in the form of granules about 0.1 to 1 mm. in diameter could be ignited at room temperature whereupon the reaction mixture heated to 560° C. in a short period of time in view of the reaction which occurred. An unground mixture of $Na_2B_4O_7+5Na_2O$ also was ignitable at room temperature and in this case the temperature rose to 490° C. during the ensuing reaction.

A number of variations are possible in the practical application of the process for the production of alkali metal borates or respectively alkaline earth metal borates. It is possible as already indicated to initiate the reaction in the reaction mixture by localized ignition from an outside source of heat whereupon the reaction self-propagates to the other portions of the reaction mixture. An ignition pellet consisting of a mixture of sodium monoxide and boron trioxide, for example, in a ratio of 3:1 or 2:1, has proved particularly well suited as a localized source of heat to effect ignition of the reaction mixtures capable of self-propagating reaction. Such pellets introduce no foreign materials into the reaction mixture and in addition the composition of such pellets can be so adjusted that they also quantitatively give the same product as the reaction itself.

It is also possible first to ignite a portion of the reaction mixture and after the reaction has begun add the other portions thereto in such quantities that the reaction propagates to the material being added. Similarly it is possible to use the heat still contained in the hot finished product for heating and igniting fresh reaction mixtures. In this instance it is preferable to feed the fresh reaction mixture continuously to a hot moving bed of finished product, for example, in a rotary furnace. In general, in this embodiment of the process the bed of hot finished product is maintained at a temperature between 350 and 450° C. as in such instance the reaction product produced is in the form of a granular flowable mass which is easy to handle.

The term "water free" is used herein not only to exclude the presence of moisture or water as such but also to exclude water of crystallization.

We claim:

1. A process for the production of a water free borate composition selected from the group consisting of alkali metal borates in which the molar ratio of alkali metal monoxide to boron trioxide is greater than 1:2 and mixed alkali metal alkaline earth metal borates in which the molar ratio of alkali metal monoxide + alkaline earth metal oxide to boron trioxide is greater than 1:2 which comprises heating at least one water free reactant oxide selected from the group consisting of alkali metal monoxides and alkaline earth metal monoxide in admixture with water free sodium tetraborate until reaction initiates between all oxide reactants and the sodium tetraborate, the quantity of the oxide reactant being between 1 and 5 mol inclusive per mol of sodium tetraborate.

2. The process of claim 1 in which the oxide reactant is sodium monoxide.

3. The process of claim 1 in which the oxide reactant is a mixture of sodium monoxide and calcium monoxide.

4. The process of claim 1 in which the oxide reactant is sodium monoxide and the reaction mixture is locally heated by an external source of heat to initiate the reaction at such heated locus, said heating from an external source is then discontinued and the reaction permitted to go to completion without further supply of heat from an external source.

5. The process of claim 4 in which an ignited mixture of sodium monoxide and boron trioxide is employed as the source of heat.

6. The process of claim 1 in which the oxide reactant is a mixture of a major proportion of sodium monoxide and a minor proportion of calcium monoxide and the reaction mixture is locally heated by an external source of heat to initiate the reaction at such heated locus, said heating from an external source is then discontinued and the reaction permitted to go to completion without further supply of heat from an external source.

7. The process of claim 6 in which an ignited mixture of sodium monoxide and boron trioxide is employed as the source of heat.

8. The process of claim 1 in which heat is supplied from an external source to the entire reaction mixture to raise it to reaction temperature, the supply of heat from an external source is then discontinued and the reaction permitted to go to completion without further substantial supply of heat from an external source.

9. The process of claim 1 in which the reaction in the reaction mixture is initiated by contact with sufficiently heated reaction product of the process.

10. The process of claim 9 in which the reaction mixture is continuously supplied to a moving bed of such heated reaction product.

References Cited by the Examiner

UNITED STATES PATENTS

| 1,006,798 | 10/11 | Schmidt | 23—60 |
| 1,716,874 | 6/29 | Carveth | 23—60 |
| 1,976,299 | 10/34 | Russell | 23—59 |
| 2,146,093 | 2/39 | Ritchie et al. | 23—59 |

FOREIGN PATENTS

| 555,090 | 3/58 | Canada. |

OTHER REFERENCES

Mellor: "A Comprehensive Treatise on Inorganic and Theoretical Chemistry," vol. 5, Longmans, Green & Company, New York, 1924, pages 86, 93, and 99.

MAURICE A. BRINDISI, *Primary Examiner.*